(12) United States Patent
Gutelius

(10) Patent No.: US 10,125,830 B2
(45) Date of Patent: Nov. 13, 2018

(54) WEDGE ACTUATED DRUM-IN-HAT PARKING BRAKE

(71) Applicant: FEV Europe GmbH, Aachen (DE)

(72) Inventor: Kenneth Gutelius, Lake Orion, MI (US)

(73) Assignee: FEV EUROPE GmbH, Aachen (DE)

( * ) Notice: Subject to any disclaimer, the term of this patent is extended or adjusted under 35 U.S.C. 154(b) by 0 days.

(21) Appl. No.: 15/481,111

(22) Filed: Apr. 6, 2017

(65) Prior Publication Data

US 2018/0291970 A1    Oct. 11, 2018

(51) Int. Cl.
| F16D 51/48 | (2006.01) |
| F16D 51/46 | (2006.01) |
| F16D 51/20 | (2006.01) |
| F16D 65/22 | (2006.01) |
| F16D 121/24 | (2012.01) |

(52) U.S. Cl.
CPC ............ F16D 51/46 (2013.01); F16D 51/20 (2013.01); F16D 51/48 (2013.01); F16D 65/22 (2013.01); F16D 2121/24 (2013.01)

(58) Field of Classification Search
CPC .......... F16D 51/46; F16D 51/48; F16D 51/50; F16D 51/20; F16D 51/22; F16D 65/22
USPC ................................. 188/343, 72.7
See application file for complete search history.

(56) References Cited

U.S. PATENT DOCUMENTS

| 3,388,606 A | * | 6/1968 | Hill | F16D 65/22 188/152 |
| 3,752,266 A | * | 8/1973 | Chouings | B60T 13/141 188/106 P |
| 3,809,191 A | * | 5/1974 | Woodward | B60T 13/741 188/106 A |
| 3,831,720 A | * | 8/1974 | Williams | F16D 65/22 188/343 |
| 4,219,923 A | * | 9/1980 | Marti | B60T 1/067 188/18 R |
| 4,416,356 A | * | 11/1983 | Osborne | F16D 65/562 188/106 A |
| 4,519,482 A | * | 5/1985 | Ott | F16D 65/22 188/343 |
| 4,699,256 A | * | 10/1987 | Severinsson | F16D 65/22 188/343 |
| 2009/0260929 A1 | * | 10/2009 | Boyle | B60T 13/746 188/156 |

FOREIGN PATENT DOCUMENTS

GB       1420472 A   *   1/1976  ............ F16D 65/22

* cited by examiner

Primary Examiner — Thomas J Williams
(74) Attorney, Agent, or Firm — Dinsmore & Shohl LLP

(57) ABSTRACT

An actuator for use in a drum-in-hat parking brake includes a wedge. A pair of tappets oppositely disposed from each other such that a tappet is positioned adjacent opposite sides of the wedge is included and a bearing is positioned between the wedge and an adjacent tappet. The bearing rolls along and between the wedge and the adjacent tappet and forces the pair of tappets apart from each other when the wedge moves relative to the pair of tappets. Movement of the pair of tappets away from each is used to force a pair of brake shoes into contact with a brake drum and provide a desired braking force on a brake drum.

20 Claims, 6 Drawing Sheets

WEDGE ACTUATED DRUM-IN-HAT PARKING BRAKE

FIELD OF TECHNOLOGY

The present application is directed to vehicle parking brakes, and in particular, to vehicle drum-in-hat parking brakes.

BACKGROUND

Vehicles are typically equipped with brake systems for slowing or stopping movement of the vehicle in a controlled and safe manner. Parking brake systems (also known as emergency brake systems) may also be included to ensure the vehicle does not roll after the vehicle's engine has been turned off and/or the vehicle has been left unattended. One type of parking brake is known as a drum-in-hat parking brake. The drum-in-hat parking brake includes a brake drum attached to a wheel assembly of the vehicle with a pair of opposite disposed brake shoes positioned within the brake drum. A disc may extend from the brake drum and be part of a disc-brake system for the vehicle. When the parking brake is actuated (sometimes referred to as being "set"), an actuator forces the pair of brake shoes apart from each other and into contact with an inner surface of the brake drum such that a desired braking pressure is applied thereto. The desired braking pressure prevents movement of the brake drum, wheel assembly and vehicle. However, when a vehicle with a drum-in-hat parking brake is parked on an incline, a small amount of movement of the vehicle may occur after the transmission of the vehicle has been placed in Park, the drum-in-hat parking brake has been set and the driver has removed his/her foot from the vehicle brake pedal. The small amount of movement by the vehicle may result in rotation of the brake drum, additional spreading apart of the brake shoes within the brake drum and a decrease in parking brake pressure applied to the inner surface of brake drum by the brake shoes. Such a phenomenon, i.e., rotation of the brake drum after the drum-in-hat parking brake has been set and the corresponding spreading apart of the brake shoes is often referred to as "brake wrap" and must be accommodated for in order to ensure adequate braking force is applied to the wheel assembly while the vehicle is parked.

Recently, electrically actuated drum-in-hat parking brakes that employ electric actuators have been desired. However, current electric actuators have limited actuation movement to spread or move brake shoes within a brake drum apart from each other during brake wrap and the use of electrical drum-in-hat parking brakes that accommodate brake wrap has proven difficult.

Accordingly, an improved electrically actuated drum-in-hat parking brake would be desirable.

SUMMARY

An actuator for use in a drum-in-hat parking brake includes a wedge with a narrow end, a wide end and a wedge bearing surface extending between the narrow end and the wide end. A pair of tappets oppositely disposed from each other and positioned on opposite sides of the wedge are included. A bearing is positioned between a side of the wedge and an adjacent tappet such that when the wedge moves relative to the tappets the bearing rolls between the wedge and the adjacent tappet. In embodiments, the bearing rolls along and between the wedge and the adjacent tappet in a direction from the narrow end towards the wide end of the wedge when the wedge moves relative to the tappets in a direction from the wide end towards the narrow end. As the wedge moves in the direction from the wide end towards the narrow end and the bearing rolls between the wedge and the adjacent tappet in the direction from the narrow end towards the wide end, the tappets are pushed or forced apart from each other and move in an outward direction. Movement of the tappets in the outward direction is configured to force apart a pair of opposite disposed brake shoes away from each other. Particularly, the actuator may be positioned between a pair of opposite disposed brake shoes within a brake drum and movement of the tappets in the outward direction forces the pair of opposite disposed brake shoes away from each other into contact with an inner surface of the brake drum such that a desired braking force is applied to the drum brake. In embodiments, the side of the wedge includes a wedge bearing surface with a bearing seat positioned between the narrow end and the wide end of the wedge. The bearing seat is dimensioned for the bearing to be seated therein and the bearing is seated in the bearing seat when the actuator is in a brake-release position and the bearing is not seated in the bearing seat when the actuator is in a brake-set position. The bearing rolls out of the bearing seat and along the wedge bearing surface towards the wide end of the wedge when the actuator moves from the brake-release position to the brake-set position.

In embodiments, the opposite sides of the wedge each have a wedge bearing surface that extends between the narrow end and the wide end of the wedge. In such embodiments, each of the pair of tappets are positioned adjacent to one of the wedge bearing surfaces and a bearing is positioned between each wedge bearing surface and a tappet adjacent thereto. Each of the wedge bearing surfaces may have a bearing seat that is positioned between the narrow end and the wide end of the wedge. Each of the bearing seats is dimensioned for a bearing to be seated therein. A pair of bearings are included and a bearing is seated in each of the bearing seats when the actuator is in a brake-release position and the bearing is not seated in each of the bearing seats when the actuator is in a brake-set position. When the actuator moves from the brake-release position to the brake-set position, each of the bearings roll out of a given bearing seat and roll along and between a given wedge bearing surface and an adjacent tappet towards the wide end of the wedge. In embodiments, the actuator is positioned between a pair of opposite disposed brake shoes within a brake drum of a drum-in-hat parking brake and the wedge tilts relative to the pair of tappets after the actuator is in the brake-set position and the brake drum rotates. Tilting of the wedge relative to the pair of tappets increases a distance between the pair of bearings positioned between the wedge bearing surface and the adjacent tappets and thereby increases the spreading of the pair of opposite disposed brake shoes away from each other to provide a continuous and desired braking force onto the brake drum.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

A wedge actuator and a drum-in-hat parking brake with a wedge actuator are provided. The wedge actuator includes a wedge with a narrow end and a wide end. As used herein, the term "wedge" refers to block or component having a thick or wide end, a thin or narrow end, and a taper between the thick or wide end and the thin or narrow end such that when the wedge is driven or moved between two objects or t s of an object the two objects or two parts of the object are moved in a direction close to or further away from each other. In embodiments, the wedge actuator is an electric wedge actuator that is electrically actuated.

Disposed adjacent opposite sides of the wedge are a pair of tappets such that a tappet is positioned adjacent to each side of the wedge. As used herein, the term "tappet" refers to a lever, block or component that makes contact with a wedge or bearing so as to receive and translate motion. At least one side of the wedge includes a wedge bearing surface with a bearing seat and a bearing is positioned between the wedge bearing surface and a tappet adjacent thereto. In embodiments, both sides of the wedge include a wedge bearing surface with a bearing seat and a pair of bearings are included and positioned such that a bearing is between each wedge bearing surface and an adjacent tappet. Each wedge bearing surface may include a bearing seat and a bearing may be positioned in the bearing seat of a given wedge bearing surface when the wedge actuator is in a brake-release position. Upon movement of the wedge in a direction from the wide end towards the narrow end, the pair of bearings roll out of the bearing seats and along the wedge bearing surfaces in a direction from the narrow end towards the wide end. As the pair of bearings roll in the direction from the narrow end towards the wide end of the wedge, the wedge and the pair of bearings force the tappets apart from each other, i.e., the tappets are displaced in an outwardly direction. Movement of the tappets in the outwardly direction applies a force to a pair of opposite disposed brake shoes which in turn applies a braking force to a brake drum of a drum-in-hat parking brake. In the event that brake wrap occurs to the drum-in-hat parking brake, i.e. the brake drum rotates after the actuator is in the brake-set position, the wedge tilts relative to the pair of tappets and the pair of bearings become offset along the wedge bearing surfaces. The offset of the pair of bearings along the wedge bearing surface increases a distance between the pair of bearings and a distance between the pair of tappets and thereby provides additional displacement to the opposite disposed brake shoes such that a desired braking force is maintained between the opposite disposed brake shoes and the brake drum during brake wrap.

Figure 2:
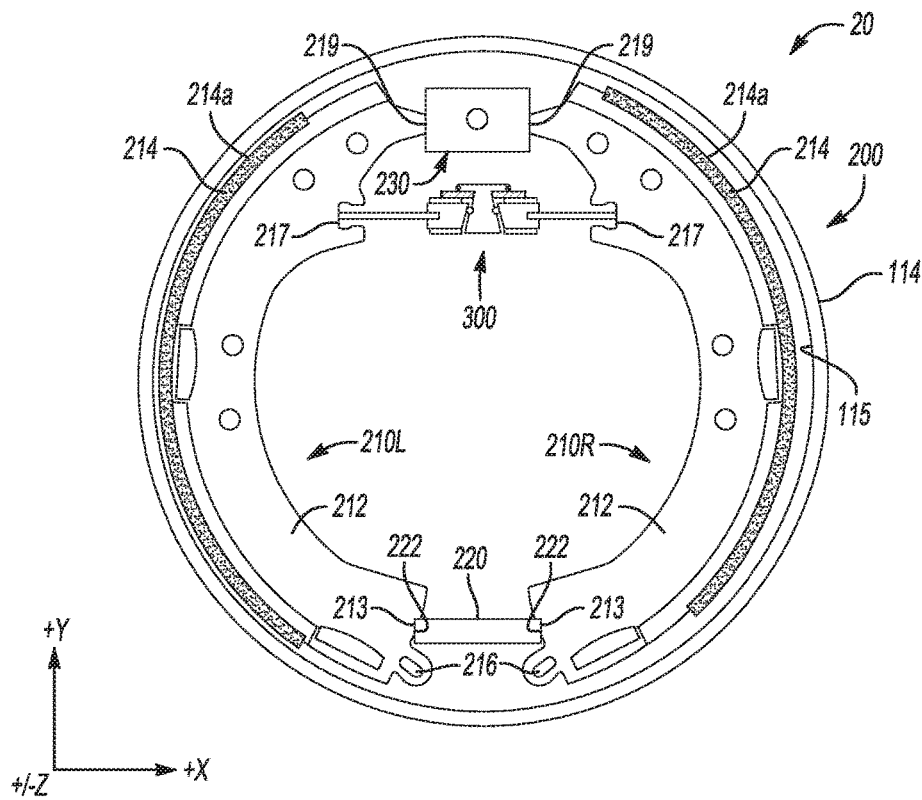
FIG. 2 schematically depicts a drum-in-hat parking brake with a wedge actuator according to one or more embodiments described and illustrated herein.
Figure 3:
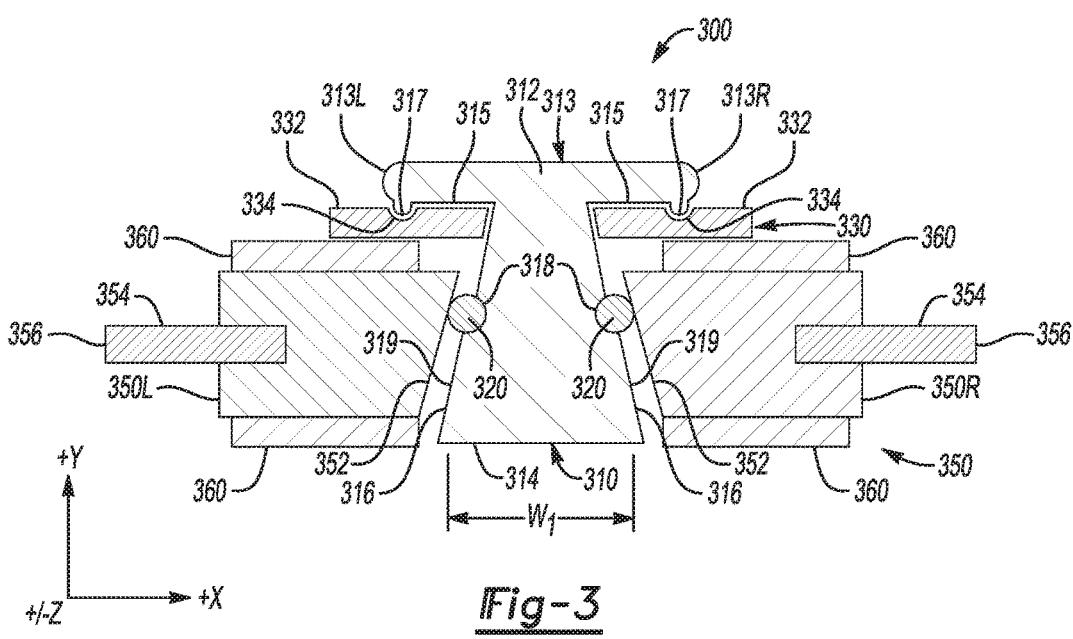
FIG. 3 schematically depicts an enlarged view of the wedge actuator in FIG. 2 according to one or more embodiments described and illustrated herein.

Referring now to FIG. 3, a wedge actuator with a wedge that has a narrow end and a wide end is depicted. Extending between the narrow end and the wide end is a pair of opposite disposed sides of the wedge (also referred to herein as "wedge sides" or "sides of the wedge"). Each of the sides of the wedge may include a bearing surface and the bearing surface may include a bearing seat. Positioned adjacent to each of the bearing surfaces is a tappet. Between each tappet and a given bearing surface is a bearing. Each of the bearings may be seated within a given bearing seat. In embodiments, each of the bearings is seated within a given bearing seat when the wedge actuator is in a brake-release position as depicted in FIG. 3. Upon movement of the wedge in a direction from the wide end towards the narrow end (+Y direction depicted in FIG. 3), the bearings roll out of a given bearing seat and along and between a given bearing surface and an adjacent tappet in a direction from the narrow end towards the wide end of the wedge (−Y direction depicted in FIG. 3). Movement of the wedge in the direction from the wide end towards the narrow end and movement of the bearings in a direction from the narrow end towards the wide end increases the distance between the bearings thereby increasing the distance between the pair of tappets. Increasing the distance between the pair of tappets increases outward displacement (+X and −X directions depicted in FIG. 3) of a pair of opposite disposed brake shoes (FIG. 2).

Figure 1A:
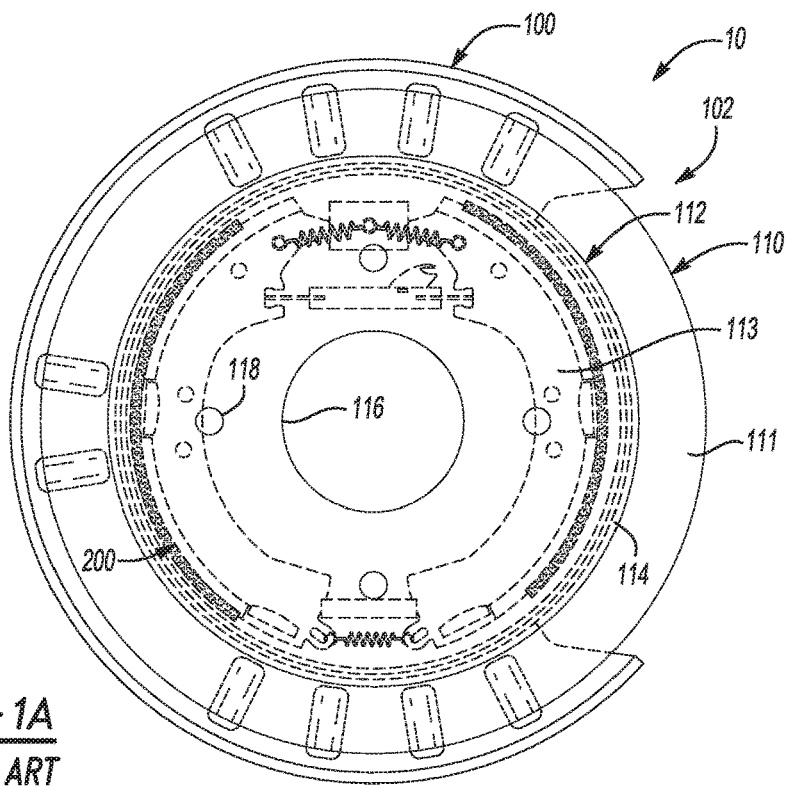
FIG. 1A schematically depicts a drum-in-hat parking brake.
Figure 1B:
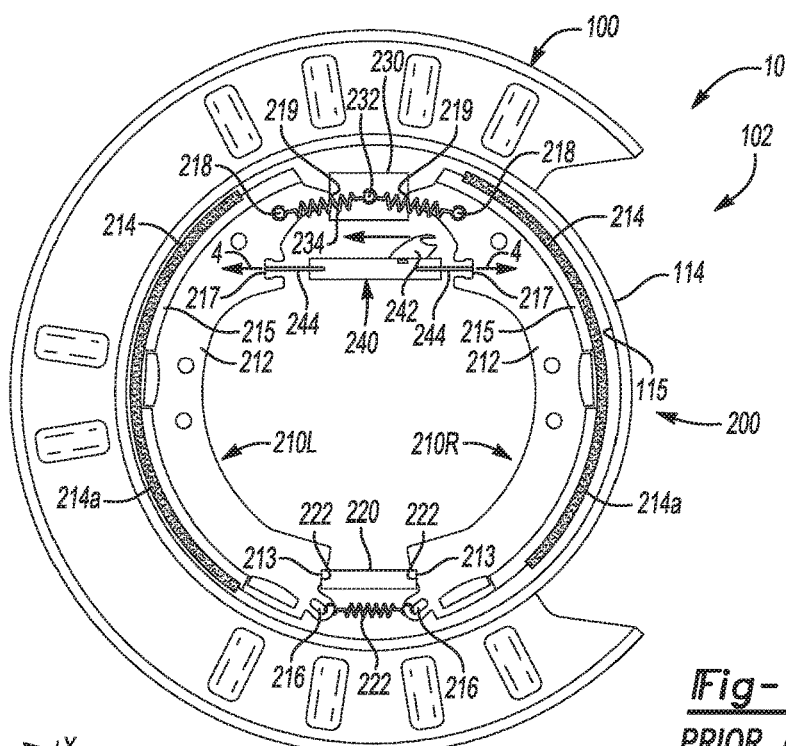
FIG. 1B schematically depicts the drum-in-hat parking brake of FIG. 1A with a cover portion removed.

Referring now to FIGS. 1A-1B, a known drum-in-hat parking brake is depicted at reference numeral 10. FIG. 1A depicts the drum-in-hat parking brake 10 with a drum-in-hat 110. The drum-in-hat 110 includes a disc 111 extending from a brake drum 112. The brake drum 112 has a drum side wall 114. A front face 113 of the drum-in-hat 110 extending from the drum side wall 114 and having a plurality of holes or apertures 116, 118 may be included and provide for attachment of the drum-in-hat parking brake 10 to a wheel or wheel assembly (not shown). A shield 100 for protecting and/or enclosing brake shoes, springs, etc., within the brake drum 112 may be included. Underneath the front face 113, i.e., within the brake drum 112, is a brake shoe assembly 200 (indicated with broken lines in FIG. 1A). FIG. 1B depicts the brake shoe assembly 200 within the drum-in-hat 110 without the front face 113 and disc 111 for clarity. The brake shoe assembly 200 includes a pair of oppositely disposed arcuate brake shoes (also referred to herein simply as "brake shoes") 210L and 210R. Each of the brake shoes 210L, 210R may include a web 212 and a brake pad 214 with an outer surface 214a supported by a backing wall 215. The pair of brake shoes 210L, 210R are positioned within the brake drum 114. Outward displacement (+X and −X directions) of the pair of brake shoes 210L, 210R forces the outer surface 214a of the brake shoes 214 into direct contact with an inner surface 115 of the brake drum 114. It is understood that an outward force on the pair of brake shoes 210L, 210R is transferred to the inner surface 115 of the brake drum 114 such that a braking force is applied to the brake drum 114. The brake shoe assembly 200 may include an adjuster 220 for adjusting a position between lower ends 211 of the brake shoes 210L, 210R. A pair of oppositely disposed adjuster slots 213 may be included within each of the arcuate brake shoes 210L, 210R such that outer ends 222 of the adjuster 220 are seated within the adjust slots 213. The lower ends 211 of the brake shoes 210L, 210R may include a spring slot 216 and a spring 223 may be coupled to each of spring slots 216 such that the lower ends 211 of the brake shoes 210L, 210R are biased towards each other. A positioning block 230 may be positioned between upper ends 219 of the brake shoes 210L, 210R such that the upper ends 219 may abut against the positioning block 230. A pair of springs 234 may be coupled to a pair of shoe spring pins 218 and a block spring pin 232 such that the upper ends 219 of the brake shoes 210L, 210R are biased towards each other and the positioning block 230. Positioned between the pair of oppositely disposed arcuate brake shoes 210L, 210R is an actuator 240. The actuator 240 includes an actuation mechanism 242 and a pair of oppositely disposed actuator arms 244. When the actuation mechanism 242 is moved in an actuation direction as depicted by arrow 2, the actuator arms 244 move in an outwardly direction as indicated by arrows 4. Movement of the actuator arms 244 in the outward direction 4 forces the pair of oppositely disposed arcuate brake shoes 210L, 210R away from each other such that the outer surface 214a of the brake pads 214 comes into contact with the inner surface 115 of the brake drum 114. Sufficient outward displacement is provided by the actuator 240 such that the brake shoes 210L, 210R are displaced outwardly from each other and the outer surface 214a of each brake pad 214 comes into direct contact with the inner surface 115 of the brake drum 114. It is understood that brake wrap may occur when rotation of the drum 114 occurs after the actuator 240 has been actuated and the actuator 240 may not provide sufficient outward displacement of the pair of brake shoes 210L, 210R such that a desired braking force is maintained between the pair of brake shoes 210L, 210R and the brake drum. It is also understood that the actuation mechanism 242 and its movement may have a different orientation relative to the shield 100 and web 212 of the brake shoes 210R, 210L than as depicted in FIG. 1B. For example and without limitation, the actuation mechanism 242 may move in an actuation direction that is in the +Z or the −Z direction depicted in FIG. 1B so long as the movement of the actuation mechanism 242 results in the actuation arms 244 moving in the outward direction 4.

Referring now to FIGS. 2 and 3, a wedge actuator 300 and drum-in-hat parking brake 20 with the wedge actuator 300 according to one or more embodiments described and illustrated herein are depicted. The drum-in-hat parking brake 20 includes the drum-in-hat 110 (only drum 114 shown) and brake shoe assembly 200. Positioned between the pair of oppositely disposed arcuate brake shoes 210L, 210R is the wedge actuator 300. The wedge actuator 300 includes a wedge 310 with a narrow end 312 and a wide end 314. In embodiments, a flange 313 extends across the narrow end 312. The wedge 310 may include a pair of oppositely disposed sides 316 with bearing surfaces 319 and each of the bearing surfaces 319 may include a bearing seat 318. Positioned adjacent to each of the bearing surfaces 316 is a tappet 350. For example, a left side tappet 350L and a right side tappet 350R may be oppositely positioned about the wedge 310 such that a tappet 350 is positioned adjacent a given bearing surface 319. A bearing 320 is positioned between the wedge 310 and each of the tappets 350L, 350R. As depicted in FIG. 3, the bearings 320 may be seated within the bearing seats 318 of the bearing surfaces 319. Oppositely disposed the bearing surfaces 319 may be tappet bearing surfaces 352 in contact with the bearings 320. Each of the tappets 350 may include a tappet arm 354 with an outward surface 356. In the alternative, each of the tappets may not include a tappet arm 354, i.e., each tappet 350L, 350R may have an outward facing surface that is complimentary in shape with a portion of the webs 212 proximate the slot surfaces 217 such that secure engagement between the outward facing surfaces of the tappets 350L, 350R and webs 312 is provided. The tappets 350L, 350R may be positioned between and slide within a pair of oppositely disposed guides 360. The flange 313 extending across the narrow end 312 of the wedge 310 may include a bottom surface 315 and a pair of knobs 317 extending from the bottom surface 315. Positioned between the pair of tappets 350L, 350R and the flange 313 of the wedge 310 may be a lift plate 330 with a pair of knob notches 334 that are complementary with the pair of knobs 317. As depicted in FIG. 3, when the bearings 320 are seated within the bearing seats 318, the outer surfaces of the bearings 320 have a distance $w_1$ there between.

Figure 4:
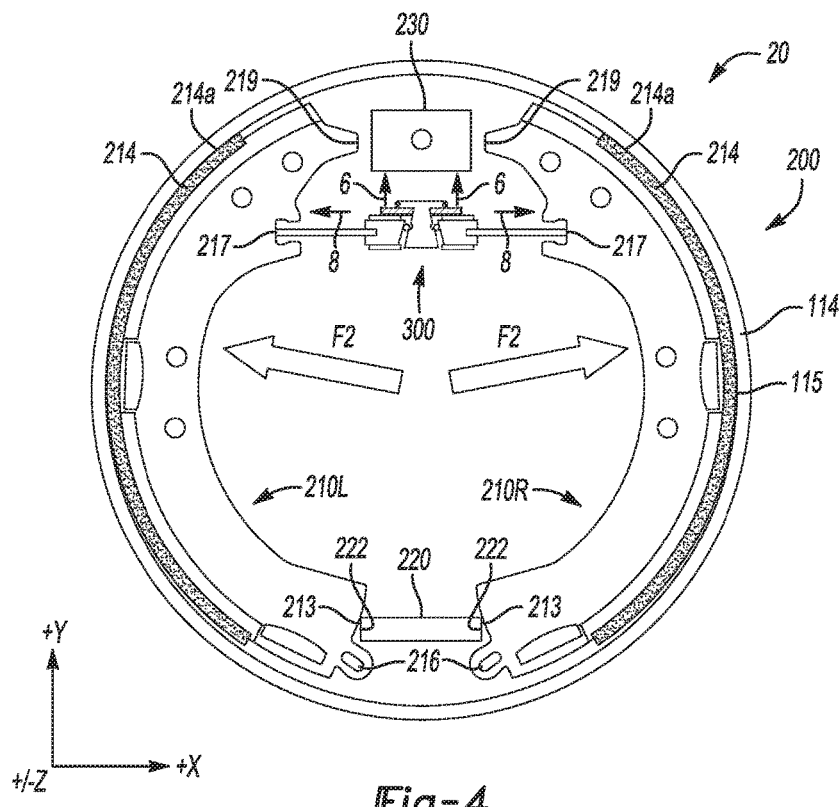
FIG. 4 schematically depicts the drum-in-hat parking brake with the wedge actuator in FIG. 2 with the wedge actuator activated and moving from a brake-release position to a brake-set position.
Figure 5:
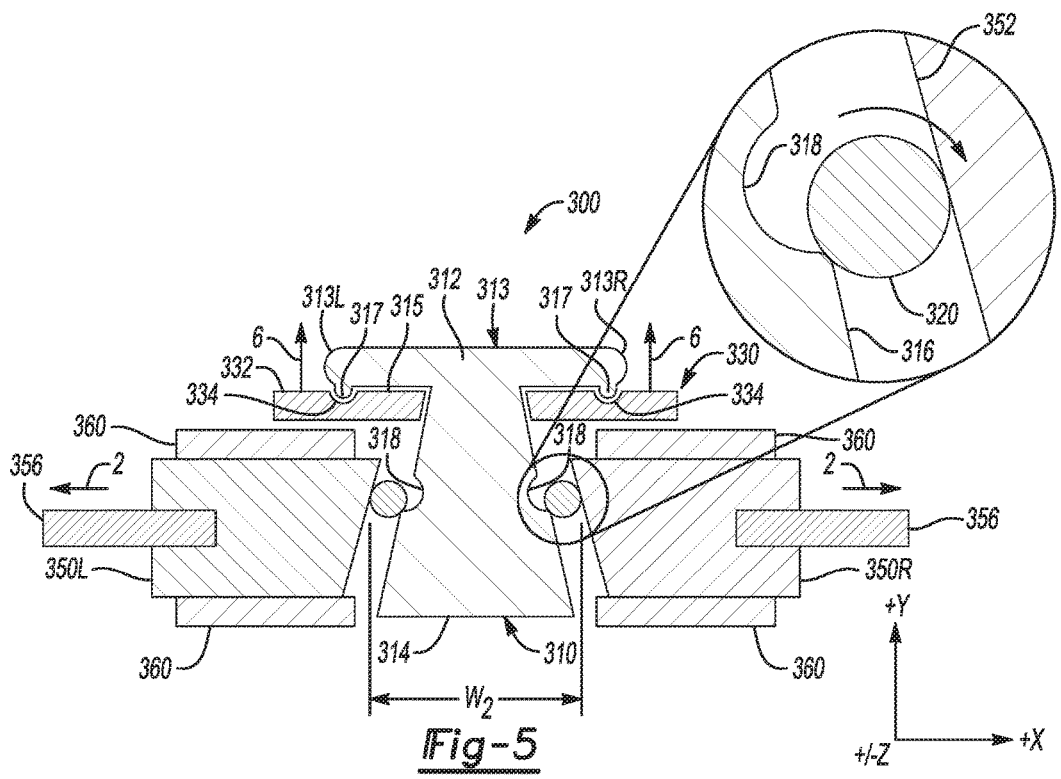
FIG. 5 schematically depicts an enlarged view of the wedge actuator in FIG. 4 according to one or more embodiments described and illustrated herein.
Figure 6:
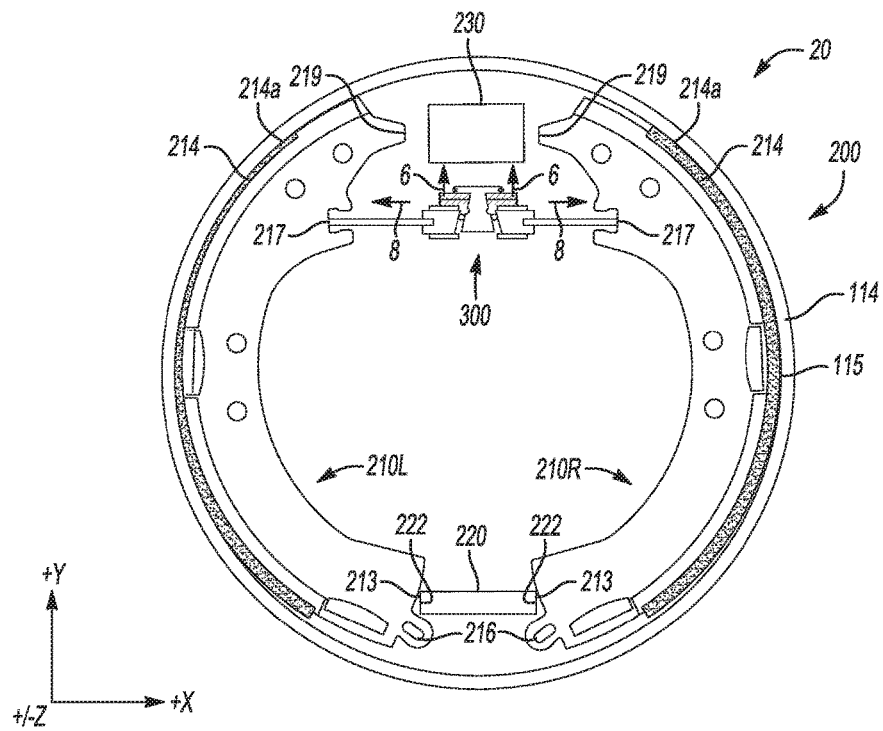
FIG. 6 schematically depicts the drum-in-hat parking brake with the wedge actuator in FIG. 2 with the wedge actuator in the brake-set position according to one or more embodiments described and illustrated herein.
Figure 7:
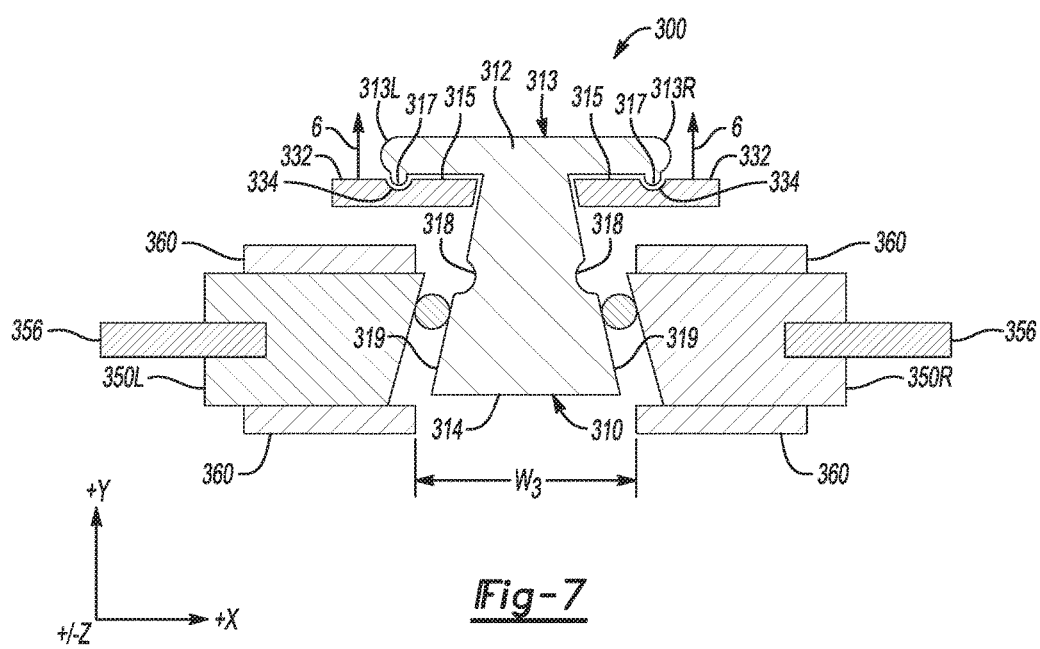
FIG. 7 schematically depicts an enlarged view of the wedge actuator in FIG. 6 according to one or more embodiments described and illustrated herein.

Referring now to FIGS. 4 and 5, the drum-in-hat parking brake 20 of FIGS. 2 and 3 is depicted with the wedge actuator 300 moving from a brake-release position as depicted in FIGS. 2 and 3 to a brake set position as depicted in FIGS. 6 and 7 and discussed in more detail below. Particularly, an actuation force 6 on the lift plate 330 as depicted in FIGS. 4 and 5 results in the lift plate 330 and the wedge 310 moving in the direction from the wide end 314 towards the narrow end 312 (+Y direction). It is understood that the lift plate 330 serves the function of moving the wedge 310 in the direction from the wide end 314 towards the narrow end 312 (+Y direction) and other configurations, components, etc., may be used to move to move the wedge 310 in the direction from the wide end 314 towards the narrow end 312 (+Y direction). Movement of the wedge 310 in the direction from the wide end 314 to the narrow end 312 (+Y direction) results in the bearings 320 rolling out of the bearing seats 318. Also, as the bearings 320 roll out of the bearing seats 318, the distance between the outer surfaces of the bearings 320 increases from $w_1$ to $w_2$, the pair of tappets 350L, 350R are displaced away from each other as indicted by arrow 8, and outer force F2 is applied to the brake shoes 210L, 210R. As depicted in FIG. 5, a relatively small upward movement (+Y direction) of the wedge 310 rolls the bearings 320 out of the bearing seats 318 and thereby results in a relatively large horizontal movement (+/−X directions) of the bearings 320. It is understood that this relatively large horizontal movement (+/−X direction) of the bearings 320 out of the bearing seats 318 may be used to quickly move the outer surfaces 214a of the brake pads 214 into direct contact with the inner surface 115 of the brake drum 114. That is, the configuration of the bearing seats 318 and bearings 320 results in a relatively large and quick (e.g., milliseconds) outward movement of the tappets 350L, 350R when the bearings 320 roll out of the bearing seats 318. In this manner the wedge actuator 300 provides for relatively quick "clearance take-up" of the drum-in-hat brake 20 once the wedge actuator 300 is activated.

Referring now to FIGS. 6 and 7, the drum-in-hat parking brake 20 depicted in FIGS. 2-5 is shown with the wedge 310 further displaced in the direction from the wide end 314 to the narrow end 312 (+Y direction) with the bearings 320 having rolled out of the bearing seats 318 and positioned along and between the bearing surfaces 319 and tappets 350L, 350R. Particularly, movement of the wedge 310 in the direction from the wide end 314 to the narrow end 312 (+Y direction), and corresponding movement of the bearings 320 in the direction from the narrow end 312 to the wide end 314 (-Y direction), further forces the tappets 350L, 350R and brake shoes 210L, 210R away from each other. It is understood that the additional outward displacement of the tappets 350L, 350R and brake shoes 210L, 210R results in a desired braking force applied to the brake drum 114 through the brake shoes 210L, 210R.

Figure 8:
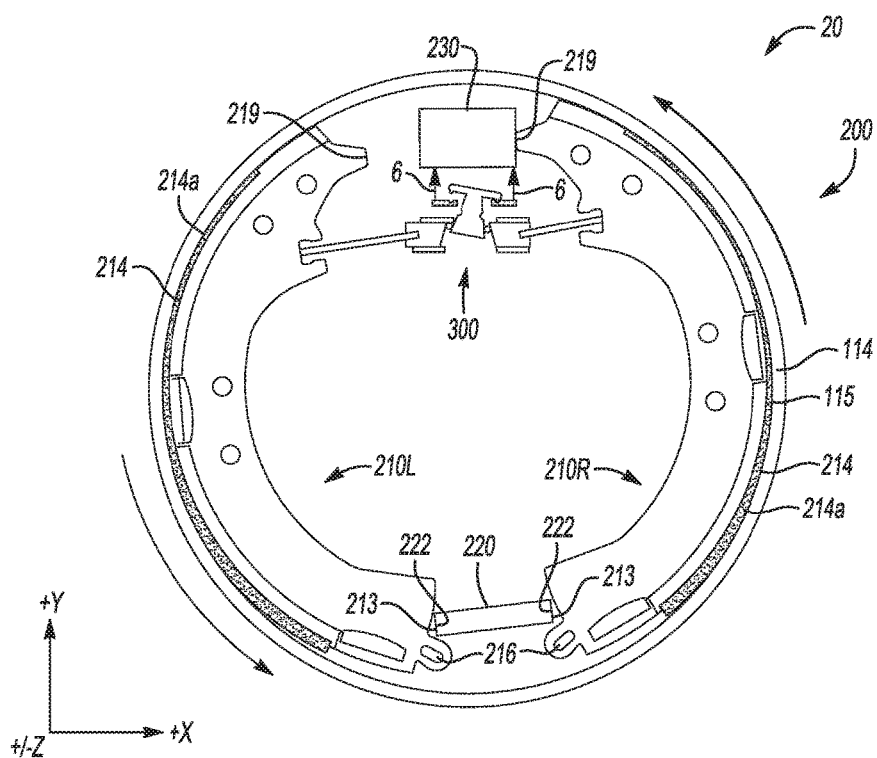
FIG. 8 schematically depicts the drum-in-hat parking brake with the wedge actuator in FIG. 2 in a tilt position resulting from brake wrap according to one or more embodiments described and illustrated herein.
Figure 9:
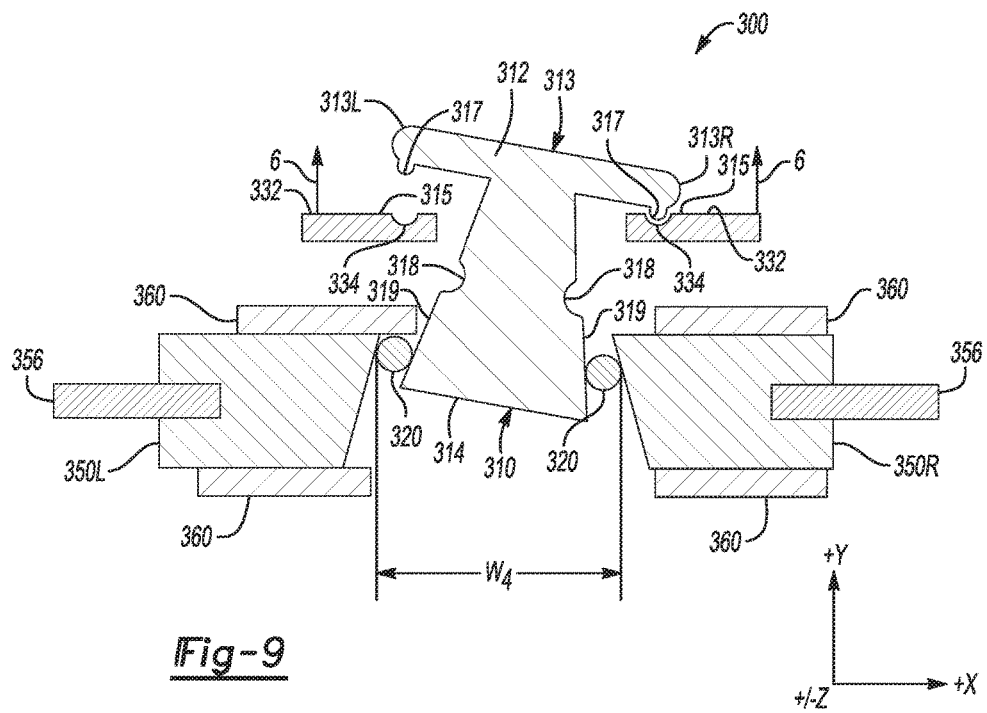
FIG. 9 schematically depicts an enlarged view of the wedge actuator in FIG. 8 according to one or more embodiments described and illustrated herein.

Referring now to FIGS. 8 and 9, the drum-in-hat parking brake 20 shown in FIGS. 6 and 7 is depicted as having been subjected to brake wrap, i.e., the brake drum 114 is depicted as having been rotated about the Z axis depicted in FIG. 8 in a counter clockwise direction after the wedge actuator 300 is in the brake-set position as depicted in FIGS. 6 and 7. Also, the wedge 310 is tilted relative to the tappets 350L, 350R, i.e. the wedge 310 depicted in FIGS. 8 and 9 is offset at an angle relative to the pair of tappets 350L, 350R as compared to the wedge 310 depicted in FIGS. 6 and 7. As depicted in FIG. 9, the offset or tilting of the wedge 310 relative to the tappets 350L, 350R offsets the bearings 320 along the opposing bearing surfaces 319, i.e., the pair of bearings 320 are positioned at different locations along the different wedge bearing surfaces 319 and a distance between the outer surfaces of the bearings 320 has increased from $w_3$ depicted in FIG. 7 to $w_4$. Accordingly, tilting of the wedge 310 accommodates the increased distance between the upper ends of 219 of the brake shoes 210L, 210R experienced during brake wrap of the drum-in-hat parking brake 20. Also, tilting of the wedge 310 relative to the pair of tappets 350L, 350R provides a brake wrap self-actuated wedge actuator 300 such that the brake wrap itself actuates the wedge actuator 300 to further increase the distances between the outer surfaces of the bearings 320, the pair of tappets 350L, 350R and brake shoes 210L, 210R and thereby maintain a desired braking force on the brake drum 114 when brake wrap occurs.

Referring now to FIGS. 2-9, in operation when a driver of a vehicle including the drum-in-hat parking brake 20 parks the vehicle on a generally level surface and sets the drum-in-hat parking brake 20, the wedge actuator 300 is actuated and the actuation force 6 is applied to the lift plate 330. The lift plate 330 subjected to the actuation force 6 moves in a direction from the wide end 314 to the narrow end 312 of the wedge 310 (+Y direction) which in turn moves the wedge 310 in the direction from the wide end 314 to the narrow end 312 of the wedge 310. As the wedge 310 moves in the direction from the wide end 314 to the narrow end 312, the bearings 320 rolling out of the bearing seats 318 as depicted in FIGS. 4 and 5. The generally horizontal movement (+/-X direction) of the bearings 320 as the bearings 320 roll out of the bearing seats 318 results in a relatively quick outward displacement of the tappets 350L, 350R and brake shoes 210L, 210R and thereby provides a relatively quick clearance take-up of the drum-in-hat parking brake 20. As the wedge 310 continues to move in the direction from the wide end 314 towards the narrow end 312 (+Y direction) the bearings 320 roll along and between the wedge bearing surfaces 319 and tappets 350L, 350R in the direction from the narrow end 312 towards the wide end 314 (-Y direction). Given the taper between the narrow end 312 and wide end 314 of the wedge 310, the distance between outer surfaces of the bearings 320 increases as the bearings roll along and between the wedge bearing surfaces 319 and tappets 350L, 350R in the direction from the narrow end 312 towards the wide end 314 (-Y direction). The wedge 310 continues to move in the direction from the wide end 314 towards the narrow end 312 (+Y direction) until a desired braking force is applied to the brake drum 114.

Still referring to FIGS. 2-9, in the event the driver parks the vehicle including the drum-in-hat parking brake 20 on an incline (e.g., a hill), the vehicle may move after the drum-in-hat parking brake 20 and the wedge actuator 300 are in the brake-set position. In such an event, the brake drum 114 may rotate and brake wrap may occur as depicted in FIG. 8. However, and in contrast to current electric drum-in-hat parking brake actuators, the wedge actuator 300 self-actuates to provide additional displacement and braking force to the brake shoes 210L, 210R. Particularly, when the brake drum 114 rotates, the wedge 310 of the wedge actuator 300 tilts relative to the tappets 350L, 350R as depicted in FIGS. 8 and 9. Tilting of the wedge 310 relative to tappets 350L, 350R further increases the distance between outer surfaces of the bearings 320 and thereby further increases outward displacement of the brake shoes 210L, 210R such that a desired braking force is maintained on the brake drum 114.

Figure 10:
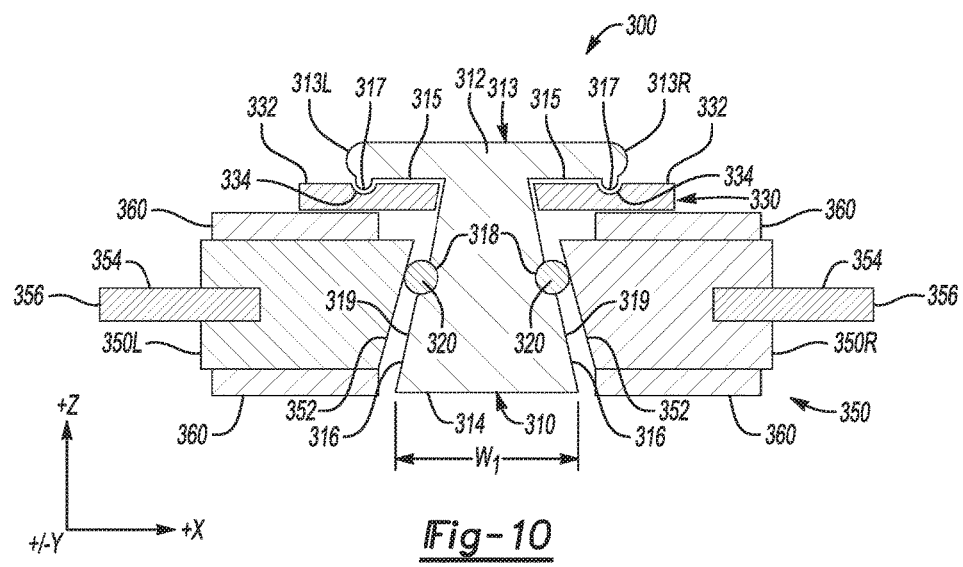
FIG. 10 schematically depicts the wedge actuator in FIG. 3 in a different orientation relative to the drum-in-hat brake in FIG. 2.
Figure 11:
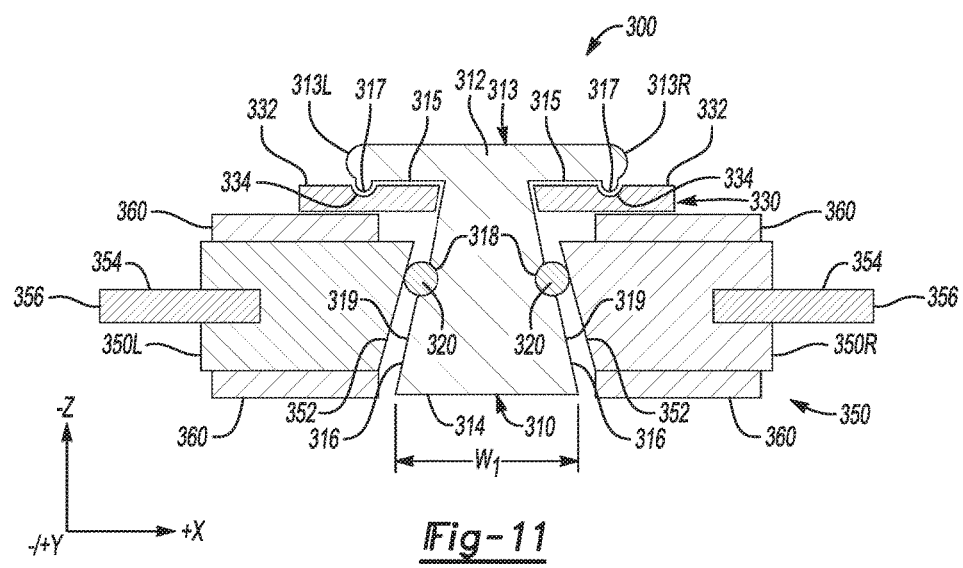
FIG. 11 schematically depicts the wedge actuator in FIG. 3 in a different orientation relative to the drum-in-hat brake in FIG. 2.

Although FIGS. 2-9 depict the wedge actuator 300 oriented such that actuation force 6 on the wedge 310 is in the +Y direction depicted in the figures, it is understood that other orientations of the wedge actuator are included within the present disclosure. For example and without limitation, FIG. 10 depicts the wedge actuator 300 oriented such the actuation force 6 on the wedge 310 is in the +Z direction, i.e., the wedge 310 moves into the plane of the figure shown in FIGS. 2-9. In the alternative, or in addition to, FIG. 11 depicts the wedge actuator 300 oriented such that the actuation force 6 on the wedge 310 is in the -Z direction, i.e., the wedge 310 moves out of the plane of the figure shown in FIGS. 2-9. Orientation of the wedge actuator 300 as depicted in FIG. 10 or 11 may allow for improved performance of the wedge actuator 300, increase clearance for movement of the wedge 300, and the like.

The above described drum-in-hat parking brake may be an electrically actuated wedge actuator with an electric motor that moves a wedge to set the parking brake, a pneumatically actuated wedge actuator with a pneumatic motor that moves a wedge to set the parking brake, and the like. The described drum-in-hat parking brake uses the wedge actuator for clearance take-up. When the wedge actuator is activated, movement of the wedge results in bearings rolling out of the bearing seats and onto wedge bearing surfaces, thereby quickly taking up clearance between the brake shoes and the brake drum. The wedge actuator also uses the motion and forces of brake wrap itself to further apply braking force on the brake shoes and thereby maintain a desired and sufficient parking brake force for a vehicle.

While particular embodiments have been illustrated and described herein, it should be understood that various other changes and modifications may be made without departing from the spirit and scope of the claimed subject matter.

Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. An actuator for use in a drum-in-hat parking brake comprising:
   a wedge with a narrow end, a wide end and a taper extending between the narrow end and the wide end;
   a flange at the narrow end;
   a pair of tappets on opposite sides of the wedge;
   a lift plate between the flange and the tappets;
   a bearing positioned between the wedge and each tappet;
   wherein:
   a force applied to the lift plate elevating the wedge above the tappets so that the bearing rolls along the taper towards the wide end of the wedge;
   the pair of tappets are forced apart from each other and move in an outward direction to exert a braking force.

2. The actuator of claim 1, wherein the wedge has a wedge bearing surface with a bearing seat positioned between the narrow end and the wide end of the wedge, the bearing seat dimensioned for the bearing to be seated in the bearing seat.

3. The actuator of claim 2, wherein the bearing is seated in the bearing seat when the actuator is in a brake-release position.

4. The actuator of claim 3, wherein the bearing is not seated in the bearing seat when the actuator is in a brake-set position.

5. The actuator of claim 4, wherein the bearing rolls out of the bearing seat and along the wedge bearing surface towards the wide end of the wedge when the wedge moves from the brake-release position to the brake-set position.

6. The actuator of claim 1, wherein:
   the wedge has a pair of wedge bearing surfaces oppositely disposed each other on opposite sides of the wedge extending from the narrow end towards the wide end of the wedge;
   both of the pair of tappets are positioned adjacent one of the pair of wedge bearing surfaces;
   the bearing is a pair of bearings positioned between the wedge bearing surfaces and the pair of tappets such that a bearing is positioned between each wedge bearing surface and the adjacent tappet.

7. The actuator or claim 6, wherein each of the pair of wedge bearing surfaces has a bearing seat positioned between the narrow end and the wide end of the wedge, each bearing seat dimensioned for one of the pair of bearings to be seated therein.

8. The actuator of claim 7, wherein each of the pair of bearings is seated in one of the bearing seats when the actuator is in a brake-release position.

9. The actuator of claim 7, wherein each of the pair of bearings is not seated in one of the bearing seats when the actuator is in a brake-set position.

10. The actuator of claim 7, wherein the pair of bearings roll out of the bearing seats and along the wedge bearing surfaces towards the wide end of the wedge when the actuator moves from a brake-release position to a brake-set position.

11. The actuator of claim 10, wherein the wedge is electrically actuated to move in the direction from the wide end towards the narrow end.

12. An actuator for use in a drum-in-hat parking brake comprising:
   a wedge with a narrow end, a wide end and a pair of opposite disposed sides that taper between the narrow end and the wide end;
   a flange extending across the narrow end;
   a pair of wedge bearing surfaces extending along the pair of opposite disposed sides;
   a pair of tappets on opposite sides of the wedge;
   a lift plate located between the flange and the tappets;
   a pair of bearings positioned between the pair of wedge bearing surfaces and the pair of tappets such that a bearing is positioned between each wedge bearing surface and an adjacent tappet;
   wherein:
   a force applied to the lift plate elevating the wedge so that the pair of bearings roll along the taper towards the wide end of the wedge;
   the pair of tappets are forced spread apart from each other and move in an outward direction to exert a braking force.

13. The actuator of claim 12, wherein the pair of wedge bearing surfaces comprise a pair of bearing seats such that each wedge bearing surface comprises a bearing seat positioned between the narrow end and the wide end of the wedge, the bearing seat dimensioned for one of the pair of bearings to be seated therein.

14. The actuator of claim 13, wherein the pair of bearings are seated in the pair of bearing seats when the wedge is in a brake-release position.

15. The actuator of claim 13, wherein the pair of bearings are not seated in the pair of bearing seats when the wedge is in a brake-set position.

16. The actuator of claim 13, wherein the pair of bearings roll out of the pair of bearing seats and along the pair of wedge bearing surfaces towards the wide end of the wedge when the wedge moves from a brake-release position to a brake-set position.

17. A drum-in-hat parking brake comprising:
   a drum brake;
   a pair of brake shoes opposite disposed from each other and positioned within the drum brake;
   a wedge actuator positioned between the pair of brake shoes and including:
   a wedge with a narrow end, a wide end and a taper extending between the narrow end and the wide end;
   a pair of tappets oppositely disposed from each other such that each is positioned adjacent an opposite side of the wedge;
   a pair of bearings, each positioned between the wedge and an adjacent tappet;
   wherein:
   placing the parking brake into a brake set position causing the bearings to roll along the taper towards the wide end of the wedge;
   the pair of tappets and the pair of brake shoes are forced apart from each other and move in an outward direction;
   upon achieving the brake set position, subsequent rotation of the brake drum transferring to the brake shoes, causing the tappets to displace in a similar direction relative to the wedge, resulting in a brake wrap condition with the tappets unevenly positioned relative to the wedge, the wedge adjusting to the brake wrap condition by tilting in response to additional and uneven rolling of the bearings relative to each other along the taper and towards the wide end of the wedge to further increase a distance between the bearings, with additional outward displacement of the tappets and brake shoes maintaining braking force on the brake drum.

18. The drum-in-hat parking brake of claim 17, wherein the pair of bearings are seated in a pair of bearing seats positioned between the narrow end and the wide end of the wedge when the wedge is in a brake-release position.

19. The drum-in-hat parking brake of claim 18, wherein the pair of bearings are not seated in the pair of bearing seats when the wedge is in the brake-set position.

20. The drum-in-hat parking brake of claim 19, wherein the pair of bearings roll out of the pair of bearing seats and towards the wide end of the wedge when the wedge moves from the brake-release position to the brake-set position.

* * * * *